(No Model.)
R. H. SPEAKE.
AUTOMATIC GAS GOVERNOR.
No. 396,899. Patented Jan. 29, 1889.
Fig. 1
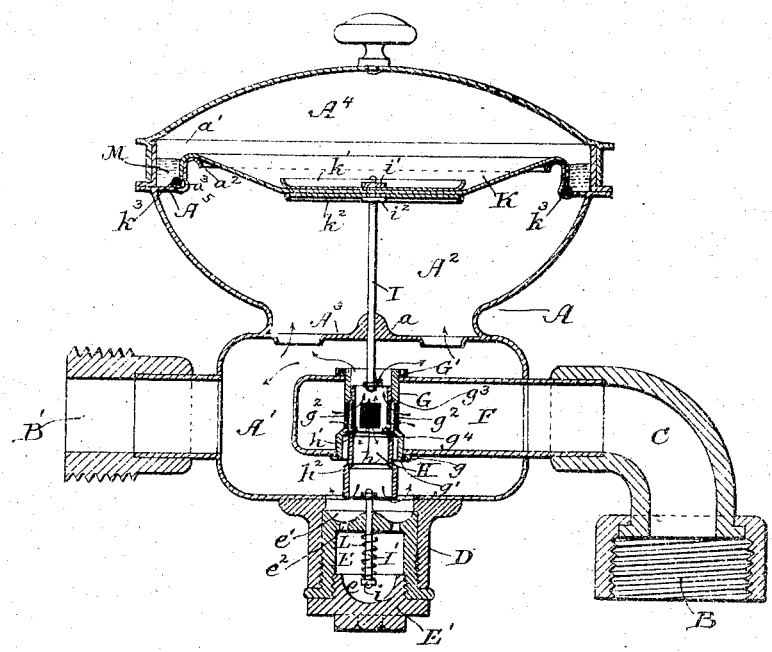
Fig. 3
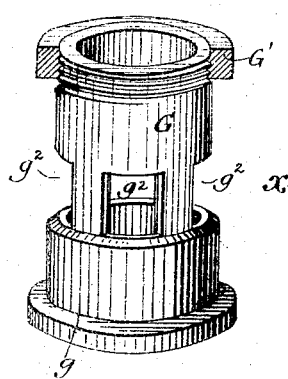
Fig. 2
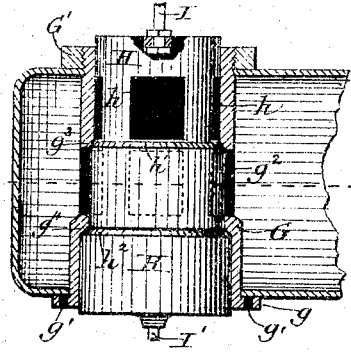
Fig. 4
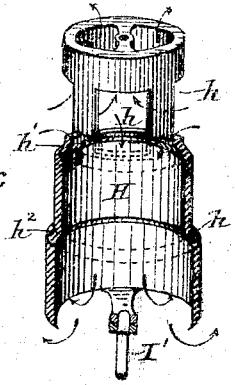
Fig. 5
WITNESSES:
Harry L. Amer.
Fred. R. Cornwall
INVENTOR:
Rufus H. Speake,
BY Wm. H. Rowe
ATTORNEY

UNITED STATES PATENT OFFICE.

RUFUS HENRY SPEAKE, OF WASHINGTON, DISTRICT OF COLUMBIA, ASSIGNOR OF TWO-THIRDS TO CHARLES A. McEUEN, CHARLES R. EBERLE, AND HENRY C. BORDEN, ALL OF SAME PLACE.

AUTOMATIC GAS-GOVERNOR

SPECIFICATION forming part of Letters Patent No. 396,899, dated January 29, 1889.

Application filed March 10, 1888. Serial No. 266,880. (No model.)

*To all whom it may concern:*

Be it known that I, RUFUS HENRY SPEAKE, a citizen of the United States, residing at Washington city, in the District of Columbia, have invented certain new and useful Improvements in Automatic Gas-Governors; and I do hereby declare the following to be a full, clear, and exact description of the invention, such as will enable others skilled in the art to which it appertains to make and use the same.

My invention relates especially to automatic gas-governors wherein a valve connected with a diaphragm, float, or piston is actuated by the pressure within the pipes leading to the burners to control the admission of gas thereto from the street-mains and resist any excessive and fluctuating pressures within the same from passing through the pipes to the burners, thereby impairing the brilliancy and quality of the flame.

Experience has determined that a pressure in excess of five-tenths of an inch upon the burners causes not only a great waste of gas, but produces a smoky, flickering, or flaring flame, thus causing a poor light and poisoning the air of the room, while the gas in the street-pipes is often necessarily maintained at pressure of one and a half inch. Consequently an effective governor-valve should be so constructed that it will at all times be perfectly balanced and sensitive to the slightest fluctuations of a reduced pressure upon one side, while it is not affected by an excessive pressure upon the opposite side thereof.

It is primarily the object of my invention to provide a gas-governor with a valve which will answer these requirements, which will be completely balanced and quick in action, may be easily repaired, will provide a closely-fitting joint with its seat, and will be protected against the tar-drip from the diaphragm and walls of the governor-shell.

A further object of my invention is to provide certain novel constructions of parts for adjusting the pressure upon the valve, for removing the valve and its seat from the shell for repairs, for protecting the diaphragm from destructive wear, for securing and sealing the diaphragm in place upon the casing, and for simplifying and cheapening the governor in its various parts.

The invention consists in certain features hereinafter specifically claimed and described with reference to the accompanying drawings, wherein—

Figure 1 is a vertical sectional elevation through my improved governor; Fig. 2, an enlarged sectional elevation through the end of the inlet-pipe, the valve, and its casing detached from the other portions of the governor; Fig. 3, an enlarged perspective in detail of the exterior of the valve-casing; Fig. 4, a similar enlarged representation of the valve; and Fig. 5, a horizontal section in the line X X of Fig. 2 through the inlet-pipe, the valve, and valve-casing.

The shell A of the governor is preferably made of sheet-metal sections stamped into the required shape, soldered together, and fitted with a cast-metal pipe-coupling, B B', elbow C, cap D, and drip-cup E to secure cheapness and lightness of construction. A longitudinal inlet-pipe, F, also of sheet metal, passes through the lower portion, A', of the shell and supports the cylindrical valve-casing G and cylindrical valve H to move longitudinally within said casing, and connected at its upper end by a stem, I, with a leather diaphragm, K, supported horizontally in the upper portion, $A^2$, of the shell, as will hereinafter appear.

The valve-casing G has circumferential ports $g^2$ through its middle portion, and also has inwardly-projecting valve-seats $g^3$ and $g^4$, located, respectively, above and below the said ports $g^2$, and the valve H, which fits within said casing to move longitudinally therein, has similar ports, $h$, at one end thereof, and shoulders $h'$ and $h^2$, located, respectively, at its middle and lower end to fit upon the inwardly-projecting valve-seats and to permit the ports of the valve to be placed in a register with the ports of the valve-seat or securely closed therefrom when required.

The valve H has a lower stem, I', which passes through the upper end of the drip-cup E, and a spiral spring, L, inclosed within the drip-cup, is attached to the end of the lower valve-stem, I', and serves to keep the valve H at the desired pressure, regulated by a screw-nut, i, fitted upon the end of the lower stem, I', and pressing against the spring L.

A screw-cover, E, having a basin, e, therein to catch the tar, screws into the lower end of the drip-cup for emptying the same and for adjusting the spring L, and the upper end of the drip-cup has a similar basin, e', upon its upper side, and is perforated at $e^2$ to permit the drip to pass down the cup without coming in contact with or obstructing the movement of the stem.

A spider, $A^3$, supports the upper stem, I, leading to the diaphragm, and has a central hub, a, located above and extending outside of the valve and its casing, which protects them against drip from the diaphragm and the walls of the shell, and thus permit the valve at all times to work freely.

The valve-casing G is screw-threaded externally at its upper end, and is fitted in a screw-threaded ring, G', secured to the upper side of the inlet-pipe, and has a lower flange, g, to fit closely against the under side of said inlet-pipe, suitable pin-holes, g', being formed in said flange to admit of the removal and replacement of the valve and its valve-seat, which may be thus easily accomplished by first removing the cap D in the bottom of the shell. A cap, $A^4$, fits the upper open end or rim, a', of the shell, and an inwardly-projecting gutter, $A^5$, having an inner rounded flange, $a^2$, receives the peripheral edge of the diaphragm K, which is securely held within the groove $a^3$ in the bottom of the gutter by a metal ring or wire, $k^3$, sprung over the periphery of the diaphragm opposite said groove to encircle the same. The central portion of the diaphragm is clamped securely upon its upper and lower sides between metal plates k' $k^2$ and jam-nuts i' $i^2$, screwing upon the upper end of the valve-stem I, which serve to stiffen the diaphragm at that point and provide a secure and stable connection between it and the valve-stem, and the peripheral edge of the diaphragm will rest upon the rounded flange $a^2$ and move up and down upon it without cracking or wearing away. The outer edge of the diaphragm is also held securely within the gutter $A^5$, as above described, and sealed to prevent leakage of gas through the joint by a ring of wax or similar congealing substance, M, poured, when hot, into the gutter $A^5$ and allowed to cool and harden.

The wax when hard will not evaporate, the gas will not act deleteriously upon it, and it may be easily remelted when the diaphragm is to be renewed.

The operation of my device is as follows: The pressure-regulating spring having been set to the burning-pressure, the gas will pass into the inlet-pipe from the street at an increased pressure, fluctuating under varying circumstances and passing at all times completely around the valve and its casing, thus completely balancing the valve and permitting it to move freely in the valve-casing and respond in its movements to the slightest variation of pressure when the pressure is in excess of that for which the governor is set to close or partly close the valve and cut off the flow of gas, thus maintaining the burning-pressure within the governor. The gas first passes through the ports of the valve-casing and valve and through both of the open ends of the latter to the burners without obstruction until the interior of the governor-shell is filled, and the gas within the same presses beneath the diaphragm without affecting the valve unless its pressure is increased sufficiently to raise the valve, and thus close its ports until the pressure of the gas within the governor is reduced, an excessive pressure of gas causing the valve to be lifted to its full height, which will bring the circumferential seats located above and below the ports of the valve in close contact with the surrounding shoulders upon the inner side of the valve-casing, and thus completely shut off the gas from the burners until the pressure is reduced within the pipes leading thereto.

The valve-seats and shoulders may be easily ground to form a tight joint, and thus permit the valve to fit snugly without binding upon the inner surface of the casing, and when the joint has become worn the valve-seat and its casing may be easily removed by first removing the cap from the under side of the shell, and a similar but perfect-fitting valve-seat and casing substituted therefor without loss of time, and the old valve and its casing carried to the shop for repairs, if such should be found necessary.

The valve-casing, valve, and their connections are well protected from the tar drip, which is caught upon the central hub of the spider and carried sufficiently to one side, from whence it passes down to the drip-cup in the cap upon the bottom of the governor and may be easily removed at any time.

The outer edge of the diaphragm, being subject to the greatest amount of wear, rests upon the rounded flange of the sealing-gutter and is free to bend without breaking.

When the cover to the shell is removed, the gutter may be easily cleared of the wax and the old diaphragm replaced by a new one, should it be required, by simply removing the band of wire surrounding its lower and outer edge and removing the nut and plate secured to the valve-rod upon the upper side of the diaphragm.

I claim as my invention and desire to secure by Letters Patent—

1. In a gas-governor, substantially as described, the combination, with the shell, of the inlet-pipe, the cylindrical valve-casing, and a cylindrical valve actuated by the pressure of gas within the pipes leading from the shell to the burners, having circumferential ports to register with similar ports in the casing, and having discharge-openings at both of its ends leading to the service-pipe, substantially as described, for the purpose specified.

2. A gas-governor comprising a shell, a valve-casing located within said shell, having ports to surround the valve, the cylindrical valve having peripheral ports and also having discharge-openings at both of its ends leading to the service-pipe secured in said seat to control the admission of gas to the shell, and the diaphragm for supporting said valve, actuated by the gas within the shell, substantially as described.

3. The combination, with the inlet-pipe and its exterior shell, of the open-ended cylindrical valve-casing passing transversely through said inlet-pipe and opening at both of its ends into the shell, and having peripheral ports opening therein, the cylindrical valve fitted to move longitudinally within said casing, having circumferential induction-ports to register with the ports of the valve-casing and open at both of its ends to discharge into the exterior shell and service-pipe, and a diaphragm arranged within said exterior shell for actuating the valve, substantially as described.

4. The combination, with the exterior shell and inlet-pipe projecting into said shell, of an open-ended cylindrical valve-casing passing transversely through said inlet-pipe, and a cylindrical valve having peripheral ports and discharge-openings at both of its ends leading to the service-pipe, substantially as described.

5. The combination, with the shell, of the inlet-pipe passing into said shell, the cylindrical valve-casing fitted transversely through the inlet-pipe, the cylindrical valve adapted to move longitudinally within the valve-casing and across the inlet-pipe, the diaphragm attached to the valve and actuated by the pressure within the shell, and the adjustable spring-actuated rod secured to the lower end of the valve to hold the valve against the pressure beneath the diaphragm, substantially as described.

6. The combination, within the inlet-pipe of the open-ended cylindrical valve-casing having a circumferential port or ports and inwardly-projecting valve-seats respectively above and below said ports, and the cylindrical valve fitted to move longitudinally within said casing and having ports to register with those of the casing, and outwardly-projecting circumferential shoulders to fit upon the valve-seat of said casing, substantially as described.

7. The combination of the shell having an inlet-pipe projecting therein, the cylindrical valve and its casing fitted into the inlet-pipe, the diaphragm located in the upper portion of the shell, and the perforated crown-sheet overlying the valve, having the inner rim of its central portion to project outside of the rim of the valve and seat to allow free passage of the gas to the under side of the diaphragm and protect the valve and its seat from tar drip, substantially as described.

In testimony whereof I hereby affix my signature in presence of two witnesses.

RUFUS HENRY SPEAKE.

Witnesses:
WM. H. ROWE,
F. M. GREEN.